Patented June 27, 1950

2,513,243

UNITED STATES PATENT OFFICE 2,513,243

POLYMERS FROM THE CYCLIC DIMERS OF DIOLEFINES

Robert F. Leary, Rahway, and John D. Garber, Cranford, N. J., assignors to Standard Oil Development Company, a corporation of Delaware No Drawing. Application December 29, 1945, Serial No. 638,513

5 Claims. (Cl. 260—94.2)

This invention pertains to certain oily or solid polymeric materials and to a method of producing them.

It has been known that rubber-like polymers of butadiene and piperylene or their copolymers with other unsaturated comonomers can be thermally treated to form hard, insoluble, cyclized resins resembling hard rubber in some respects. The polymers heretofore subjected to this thermal conversion or cyclization process have been characterized as non-distillable and in general were solid, rubber-like materials.

Vinyl cyclohexene or 1-vinyl-3-cyclohexene is a cyclic dimer of butadiene and is readily prepared by heating butadiene-1,3 at a temperature of about 130–170° C., preferably at about 150° C. for a few hours in the substantial absence of oxygen or in the presence of about 0.01 to about 1.0 wt. per cent of an inhibitor such as hydroquinone, tertiary butyl catechol, benzoquinone, phenyl-beta-naphthylamine and the like. If piperylene or isoprene is used instead of butadiene, corresponding methylated vinyl cyclohexenes are obtained. The presence of an inhibitor is not essential for satisfactory dimerization. Dimerization is purely a thermal reaction and one which reaches an appreciable rate only above 100° C. At temperatures of 130–170° C. the dimerization reaction speed (about 5–15% per hour) is far greater than mass polymerization to form rubber-like molecules, even in the presence of peroxide catalysts. These cyclic dimers have generally been considered to be unpolymerizable, or at least, in contradistinction to styrene and other vinyl compounds, they appear to be unable to polymerize by the usual free radical or ionic mechanism to form high molecular weight, linear type macromolecules.

It has now been found that the cyclic diolefins obtained by dimerizing butadiene, piperylene, isoprene or the like and having a water-like consistency can be further polymerized to form oils of high viscosity at ordinary temperatures or soluble thermoplastic resins by treating the same in the presence of a Friedel-Crafts type catalyst, preferably dissolved in an alkyl halide such as methyl or ethyl chloride. The reaction is ordinarily conducted at temperatures below about 100° C. It is believed to be most surprising that this reaction takes place because, as noted above, it was previously considered that these cyclic dimers were not further polymerizable and because there is considerable evidence that an appreciable concentration of dimer may inhibit other types of polymerization of butadiene, piperylene, isoprene etc.

The conversion of these cyclic dimers into oily to resinous polymerization products in accordance with the present invention can be effected by treating the dimer or a solution of the dimer in an inert solvent such as benzene, naphtha or alkyl halides such as methyl chloride, ethyl chloride, propyl chloride, chloroform and the like with a Friedel-Crafts type catalyst such as aluminum chloride, aluminum bromide, titanium tetrachloride, boron trifluoride and the like. It is preferred to use the catalyst in the dissolved state such as in solution in methyl or ethyl chloride or other alkyl halide. The temperature of the reaction is ordinarily below about 100° C. and preferably at temperatures between about 25–50° C. As a general rule, products having higher softening points, which indicate higher molecular weights, are obtained at temperatures around 0° C.

The products formed in accordance with this invention vary from viscous oils to hard resinous materials which are completely soluble in benzene or the like. The resinous products formed are particularly useful as bodying agents in varnishes and may also be used as adhesives, resins and rubber modifying agents. The polymer product may be used as formed or the crude product may be separated into one or more oily fractions and one or more resinous fractions by solvent extraction. This may be accomplished by dissolving the crude product in a suitable solvent such as benzol, toluene, carbon tetrachloride, chloroform and ethyl or propyl ethers and then adding a suitable non-solvent or precipitant such as acetone or a lower alcohol such as methyl-, ethyl-, propyl- or butyl alcohols. The last traces of solvent and/or precipitant may be readily removed from the resin by blowing with nitrogen or other inert gas at 150–200° C. and/or by heating the product under vacuum at about the same temperatures.

The following examples are illustrative of the present invention:

Example 1

20 c.c. of butadiene dimer or 1-vinyl-3-cyclohexene was mixed with 100 c.c. of naphtha, and a saturated solution of aluminum bromide in naphtha was poured in. All of these materials were at room temperature or about 25° C. The reaction was very rapid and was completed within three minutes, the polymer being almost completely insoluble in the naphtha. The polymer, however, was soluble in benzene except for a small fraction. On evaporation, the benzene solution gave a clear, plastic film.

Example 2

A solution of 300 g. of butadiene dimer (vinyl cyclohexene) in 900 g. of chloroform was treated with 400 c.c. of 5% $AlCl_3$—EtCl catalyst at 40° C. The ethyl chloride boiled out due to the heat of reaction and was readily recovered in a pure state. The polymer was soluble in the red-purple colored reaction mixture, but was precipitable as a white powder by the addition of alcohol. The reaction mixture was washed with several portions of water to remove catalyst residues and water soluble materials and the polymer recovered as a slightly yellow, clear resin on evaporation of the chloroform solvent. The yield was 248 g. of resin, softening point 98° C. A portion of the resin was recovered from the unwashed reaction mixture by heating in an air oven at 120° C. for four hours, the dry product was completely insoluble in common solvents, perhaps due to the action of residual catalyst. Use as a thermosetting resin is indicated.

Example 3

A similar run to that of Example 2 was carried out at 0° C. using ethyl chloride as a diluent and methyl chloride as a catalyst solvent. The purified resin had a softening point of 112° C. which indicates a higher molecular weight as compared to that in Example 2.

Example 4

A 30% solution of vinyl cyclohexene in ethyl chloride was treated at room temperature with gaseous $BF_3$. A slow reaction occurred to give a soft plastic resin in 40% yield.

Example 5

Liquid $TiCl_4$ (10 c. c.) was added dropwise to 500 c. c. of a 30% solution of vinyl cyclohexene in chloroform. A small amount (perhaps 5% yield) of oily polymer was recovered from this reaction mixture. This oil dried to a hard film when exposed to air in the presence of 0.05% Co and 0.50% Pb.

Example 6

A solution of 100 g. of vinyl cyclohexene in 300 g. of 54 naphtha (a petroleum distillate having a boiling range of approximately 165–235° F. which is mainly paraffinic in nature) was heated to 50° C. At this temperature a solution of $AlBr_3$ in naphtha (saturated at 25° C.) was added at a rate such that the reaction mixture was maintained at 50° C. Partial precipitation of the resin occurred though some of the product remained in solution.

After washing and drying the resin (75% yield) was found to be completely soluble in toluene (though still partially insoluble in naphtha). Films cast on tin panels were air dried and baked to form tough, insoluble, water, acid and alkali resistant coatings.

Example 7

A 15 gallon varnish was prepared from a sample of polyvinyl cyclohexene resin (M. P. 98° C.) prepared as described above and alkali refined linseed oil. For this cook, 300 g. of resin and 360 g. of oil were heated at 560° F. for 4 hours. At the end of this time a heavy body was obtained and the reaction mixture had a cure time of 30 seconds.

The varnish was thinned to 50% solids with Varsol #2 (This is a petroleum distillate—B. P. approximately 305 to 395° F. It is mainly paraffinic, but contains about 5% aromatic material) and had a viscosity of V and a color of 10 on the Gardner scale. Driers in the amount of 0.055% Mn, 0.066% Ca and 0.367% Pb, based on total solids, were added and air dried films were set-to-touch in 5 minutes and dry hard (tack-free) in one hour. Another set of panels was baked for 4 hours at 120° C.

The air dried panels had a pencil hardness of H and the baked panels, 9H. The results of further tests are shown below—a rating of 1 is excellent (no effect on film) and 5 is very poor.

| Test | Rating | |
|---|---|---|
| | Air Dried | Baked |
| Water Resistance (24 hours immersion @ room temperature) | 2 | 1 |
| Water Resistance (1 hour immersion @ 100° C.) | 3 | 1 |
| Flexibility and Adhesion | 1 | 1 |
| Naphtha Insolubility | | 2 |
| Grease Resistance | | 1 |
| Color | 1 | 3 |
| Alkali Resistance (4 hour immersion in 3% NaOH) | 2 | 1 |

The foregoing description contains a limited number of embodiments of the present invention. It will be understood, however, that this invention is not limited to the specific conditions disclosed since numerous variations are possible without departing from the scope of the following claims.

What we claim and desire to secure by Letters Patent is:

1. A process of preparing a resinous homopolymer which comprises adding a catalyst solution consisting of an aluminum halide dissolved in an alkyl chloride of 1 to 3 carbon atoms to a cyclic dimer of a diolefin of the group consisting of butadiene, piperylene and isoprene, and maintaining the resulting mixture at a temperature between 0 and 100° C. until a resinous homopolymer having a softening point between about 98 and 112° C. is formed.

2. A process of preparing a resinous homopolymer which comprises adding a catalyst solution consisting of aluminum chloride dissolved in an alkyl chloride of 1 to 3 carbon atoms to vinyl cyclohexene, and maintaining the resulting mixture at a temperature between 25 and 50° C. until a resinous homopolymer having a softening point between 98 and 112° C. is formed.

3. In a process of preparing a resinous homopolymer, the improvement which consists of mixing 1 part by weight of vinyl cyclohexene and 3 parts by weight of chloroform and adding to the resulting mixture at a temperature between 25 and 50° C. a catalyst solution consisting of about 5% aluminum chloride dissolved in ethyl chloride whereby a resinous homopolymer having a softening point of about 98° C. is formed in the reaction mixture.

4. A hard, solid, resinous homopolymer of a cyclic dimer of a diolefin of the group consisting of butadiene, piperylene and isoprene having a softening point between about 98 and 112° C. and prepared by the process of claim 1.

5. A hard, solid, resinous homopolymer of vinyl cyclohexene having a softening point between about 98 and 112° C., prepared by the process of claim 2.

ROBERT F. LEARY.
JOHN D. GARBER.

REFERENCES CITED

The following references are of record in the file of this patent:

FOREIGN PATENTS

| Number | Country | Date |
|---|---|---|
| 516,931 | Great Britain | Jan. 16, 1940 |

OTHER REFERENCES

Ellis, The Chemistry of Synthetic Resins, vol. I, page 172 (1935), Reinhold Publishing Co.